(12) United States Patent
Liu et al.

(10) Patent No.: US 6,812,679 B2
(45) Date of Patent: Nov. 2, 2004

(54) HIGH EFFICIENCY AC-DC CONVERTER WITH POWER FACTOR CORRECTOR

(75) Inventors: Joe Chui Pong Liu, Kwai Hing (HK); Franki Ngai Kit Poon, Kowloon (HK); Man Hay Pong, Ap Lei Chau (HK)

(73) Assignee: The University of Hong Kong, Hong Kong (HK)

( * ) Notice: Subject to any disclaimer, the term of this patent is extended or adjusted under 35 U.S.C. 154(b) by 71 days.

(21) Appl. No.: 10/445,655

(22) Filed: May 27, 2003

(65) Prior Publication Data

US 2003/0210024 A1 Nov. 13, 2003

Related U.S. Application Data

(63) Continuation of application No. 10/040,841, filed on Jan. 7, 2002, now Pat. No. 6,580,259.
(60) Provisional application No. 60/262,186, filed on Jan. 17, 2001.

(51) Int. Cl.[7] .................................................. G05F 1/40
(52) U.S. Cl. ........................................ 323/282; 323/222
(58) Field of Search ................................ 323/222, 223, 323/224, 273, 266, 282; 363/59

(56) References Cited

U.S. PATENT DOCUMENTS

| | | |
|---|---|---|
| 5,264,782 A | 11/1993 | Newton |
| 5,627,460 A | 5/1997 | Bazinet et al. |
| 5,737,204 A | 4/1998 | Brown |
| 5,894,412 A | 4/1999 | Faulk |
| 5,907,223 A | 5/1999 | Gu et al. |
| 5,969,484 A | 10/1999 | Santi et al. |
| 6,404,174 B1 | 6/2002 | Boudreaux, Jr. et al. |
| 6,515,463 B2 | 2/2003 | Ling |
| 6,580,259 B2 * | 6/2003 | Liu et al. ..................... 323/282 |

* cited by examiner

*Primary Examiner*—Adolf Berhane
(74) *Attorney, Agent, or Firm*—Jones Day

(57) ABSTRACT

A power converter includes a boost converter, a DC/DC converter and a coupler chain. The boost converter receives a rectified AC input and generates a high voltage output. The boost converter includes a zero-voltage-switching transistor that is operable to adjust the power factor of the rectified AC input to generate the high voltage output. The DC/DC converter is coupled to the high voltage output of the boost converter and is configured to generate a regulated output voltage. The DC/DC converter includes a complementary pair of zero-voltage-switching transistors that are operable to regulate the high voltage output of the boost converter to generate the regulated output voltage. The coupler chain is coupled between a current-carrying terminal of the zero-voltage-switching transistor of the boost converter and current-carrying terminals of the complementary pair of zero-voltage-switching transistors in the DC/DC converter. The coupler chain is operable to reduce the voltage across the current-carrying terminals of at least one of the zero-voltage-switching-transistors.

15 Claims, 6 Drawing Sheets

$M_{12}$ GATE DRIVE AT $G_{12}$ $M_{13}$ GATE DRIVE AT $G_{13}$ $M_{11}$ GATE DRIVE AT $G_{11}$

NODE 17 WAVEFORM

NODE 13 WAVEFORM $D_{11}$ CURRENT WAVEFORM

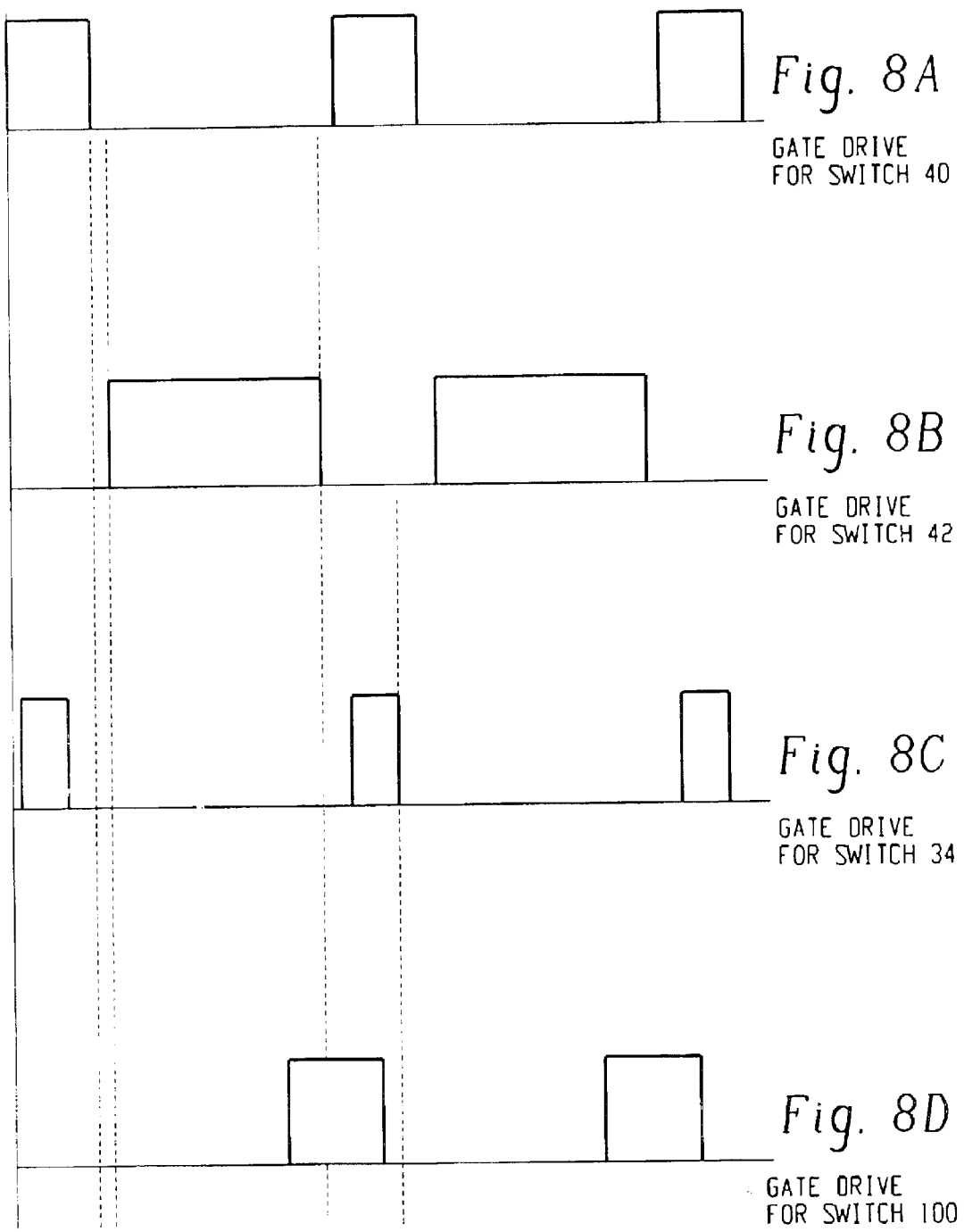

HIGH EFFICIENCY AC-DC CONVERTER WITH POWER FACTOR CORRECTOR

CROSS-REFERENCE TO RELATED APPLICATIONS

This application is a continuation of U.S. application Ser. No. 10/040,841, filed on Jan. 7, 2002 now U.S. Pat. No. 6,580,259, and entitled "High Efficiency AC-DC Converter With Power Factor Corrector," which claims priority from and is related to U.S. Provisional Application No. 60/262,186, filed on Jan. 17, 2001, and entitled "A High Efficiency AC-DC Converter With Power Factor Corrector."

BACKGROUND

1. Field of the Invention

This invention relates to the field of power converters. Particularly, this invention relates to the field of AC to DC converters with Power Factor Correction (PFC).

2. Description of the Related Art

AC/DC converters need power factor correction in order to fulfill international standards of low input harmonic current content. A front-end boost PFC converter is one way to obtain good input harmonic current to meet these international standards. Generally, another DC/DC converter is cascaded from the front-end boost PFC converter to provide a steady output voltage.

FIG. 1 shows a typical configuration of an AC-DC converter with power factor correction. Rectified AC is fed to input terminals of a boost converter 4 at nodes 0 and 1. The boost converter 4 includes an inductor $L_1$ 10, MOSFET switch $M_1$ 12, diode $D_1$ 14 and capacitor $C_1$ 16. A series of Pulse Width Modulated (PWM) voltage pulses are fed to the gate terminal $G_1$ of the MOSFET switch 12. The pulse width of the voltage pulses are programmed to make the input current follow the shape of the input sinusoidal voltage and build up a voltage across capacitor 16. A DC/DC converter 20 converts the voltage across capacitor 16 to a regulated DC voltage across output nodes 5 and 6.

A problem in boost converters is the reverse current of the diode 14 when the switch 12 turns on. When the switch 12 turns on, it draws reverse recovery current through the diode 14 and turns the switch 12 off abruptly to block the reverse voltage equal to the output voltage of the boost PFC converter 4. The output voltage is always higher than the peak of the rectified AC and very often is close to 400V. This high output voltage causes a large amount of switching loss when the diode 14 is turned off. This switching loss increases with frequency. However, high switching frequency is often required to reduce the size and weight of the passive components. Thus PFC boost converter 4 generally are lossy circuits due to the high switching frequencies of the circuit. In fact, the switching loss is associated with every switch in the boost converter 4 and every switch in the DC/DC converter 20.

Previous work uses various techniques to reduce switching losses. In U.S. Pat. No. 5,313,382, Farrington discloses a boost converter with an auxiliary switch and a resonant network to achieve reduced voltage stress at a main power switch during turn on. The boost converter also enables a soft turn off of the boost rectifier. The auxiliary switch of the boost converter is turned on without reduced voltage condition, but it has a zero current condition. In U.S. Pat. No. 5,633,579, Kim discloses a boost converter with a stress energy reproducing snubber circuit in order to reduce the stress energy of the boost rectifier during turn off. The snubber circuit reduces the voltage stress on a main switch of the boost converter during turn on. In U.S. Pat. No. 5,748,457, Poon discloses a DC/DC converter which reduces voltage stress by means of zero voltage switching, but it has no boosting and power factor correction effect.

In addition to soft switching, another problem with PFC converters is control of the switching. Some prior art techniques attempt to integrate the PFC converter and the DC/DC converter. Most of these prior art techniques include converters with fewer degrees of freedom which results in restrictions to operate the converters in certain modes, such as the discontinuous mode. These restrictions prevent maximized utilization of all the components.

SUMMARY OF THE INVENTION

A power converter includes a boost converter, a DC/DC converter and a coupler chain. The boost converter receives a rectified AC input and generates a high voltage output. The boost converter includes a zero-voltage-switching transistor that is operable to adjust the power factor of the rectified AC input to generate the high voltage output. The DC/DC converter is coupled to the high voltage output of the boost converter and is configured to generate a regulated output voltage. The DC/DC converter includes a complementary pair of zero-voltage-switching transistors that are operable to regulate the high voltage output of the boost converter to generate the regulated output voltage. The coupler chain is coupled between a current-carrying terminal of the zero-voltage-switching transistor of the boost converter and current-carrying terminals of the complementary pair of zero-voltage-switching transistors in the DC/DC converter The coupler chain is operable to reduce the voltage across the current-carrying terminals of at least one of the zero-voltage-switching-transistors.

BRIEF DESCRIPTION OF THE DRAWINGS

FIGS. 8A to 8D show graphs of the driving waveforms for the switches of the circuit of FIG. 7.

DETAILED DESCRIPTION OF THE PREFERRED EMBODIMENTS

Figure 1:
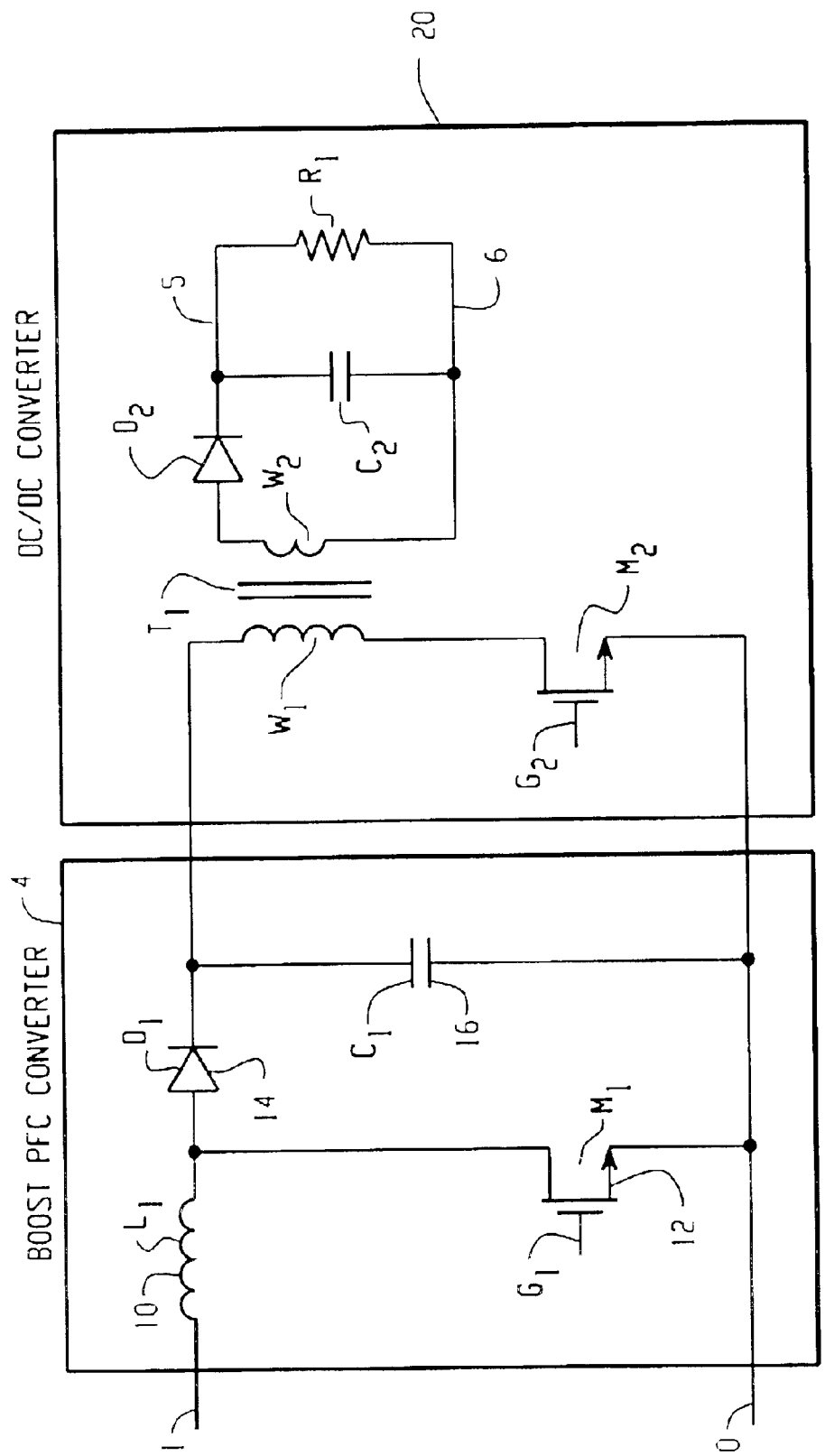
FIG. 1(Prior Art) shows a typical configuration of an AC-DC converter with power factor correction.
Figure 2:
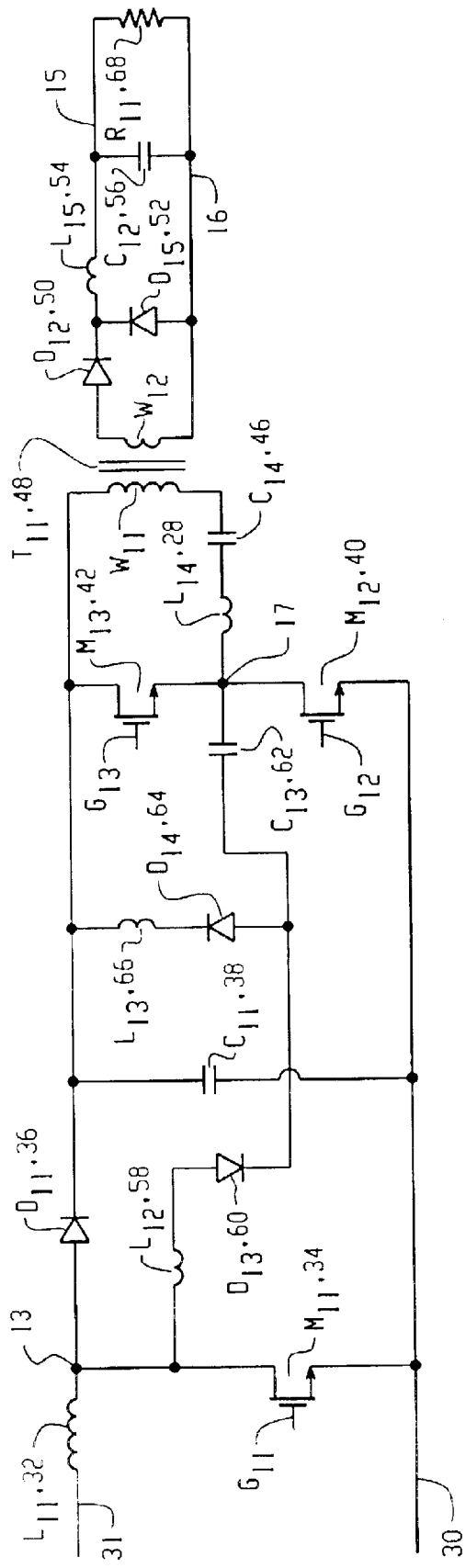
FIG. 2 shows a circuit comprising a first embodiment of the present invention.

With respect to the drawing figures, a circuit comprising a first embodiment of the present invention is shown in FIG. 2. The invention includes various interconnected parts that define a plurality of devices that can function together. The circuit includes a boost converter, a DC/DC converter, a coupler chain, a discharging chain, and a soft switch inductor 28. The boost converter includes an inductor 32, a MOSFET switch 34, a diode 36 and a capacitor 38. The DC/DC converter includes MOSFET switches 40 and 42, a capacitor 46. A transformer 48 in the DC/DC converter, having windings $W_{11}$ and $W_{12}$, couples the switches 40 and 42 to diodes 50 and 52 which are coupled to an inductor 54 and a capacitor 56. The resistance 68 is the load of the converter. The coupler chain includes an inductor 58, a diode 60 and a capacitor 62. The discharge chain includes a diode 64 and an inductor 66.

Input terminals 30 and 31 are coupled to a rectified AC source. The input terminals 30 and 31 feed the boost converter. A series of Pulse Width Modulated (PWM) voltage pulses are injected into the boost converter on the gate $G_{11}$ of the switch 34. The PWM signal is programmed to make the shape of the averaged input current follow the shape of the input voltage and produce a high power factor. A boosted voltage across the capacitor 38 is then the input voltage of the DC/DC converter. The MOSFET switches 40 and 42 are programmed to turn on and turn off to give a regulated output voltage. These switches 40 and 42 are coupled to the switch 34 through the coupler chain, which couples the boost converter to the DC/DC converter. The discharge chain couples the coupler chain to the input of the DC/DC converter so that the discharge chain can discharge the capacitor 62 and the inductor 58 of the coupler chain.

The soft switch inductor 28 is coupled to switches 40 and 42. The circuit as a whole operates the switches 34, 40, and 42 so as to soft switch each of the switches 34, 40, and 42 in the circuit. When the switch 42 turns off from its on state, current in the inductor 28 continues to flow and exchanges charge in capacitance across the switches 42 and 40. The voltage across the switch 40 then falls to zero.

The switch 40 is programmed to turn on at zero voltage. When the voltage across the switch 40 falls, then the coupler chain of components is activated because the boost switch 34 is in the off state and the diode 36 is conducting. A resonant current flows through this chain and pulls current from the boost inductor 32. Current through the diode 36 is reduced at a controlled rate and the turn off loss through the diode 36 is largely reduced. The resonant current will eventually become larger than the inductor current, which causes the diode 36 to turn off. The voltage across the switch 34 continues to fall under the influence of the resonant current in the coupler chain until it becomes substantially zero. Then, the switch 34 is programmed to turn on and the switching loss of the switch 34 is substantially reduced.

After the switch 34 remains on for the period of time needed by the boost converter, the switch 34 may be turned off regardless of the state of switches 40 and 42. These switches 40 and 42 are complementary, such that when one switch is on the other switch is off. A small time gap between switches avoids shoot through. The time gap is very small and it is regarded that 40 and 42 operate asymmetrically. Thus, as the switch 34 is turned off, there are two cases of operability for switches 40 and 42. A first case where the switch 40 is on and the switch 42 is off, and a second case where the switch 40 is off and the switch 42 is on.

In the first case, the capacitor 62 is settled to a voltage, when the switch 34 turns off, current is diverted to the capacitor 62 which acts like a snubber capacitor. Its voltage will eventually settle to the line voltage after the switch 34 has turned off.

In the second case, the capacitor 62 has discharged to near zero and does not interfere with the switching off of the switch 34. Current flows through the inductor 32 and the boost diode 36 like the current would in prior art boost converter.

The states of switches 40 and 42 may also be changed at any time after the switch 34 has turned on at the beginning of a duty cycle. Again there are two cases when the switch 40 turns off and the switch 42 turns on. The first case is where the switch 34 is still on and the second case is where the switch 34 is off. In both cases, the diode 60 prevents the initiation of resonant current through the inductor 58. When the switch 40 is turned off, energy in the inductor 28 attempts to raise the voltage across the switch 40 and reduce the voltage across the switch 42. Resonance in the coupler chain discharges the charge on the capacitor 62. When the voltage across the switch has fallen to substantially zero it is programmed to turn on. Thus the switch 42 can turn on at a voltage substantially close to zero. The switch 42 remains on for its designated duty cycle. When the switch 42 is turned off, its current has changed direction, the voltage of the capacitor 62 is zero and the whole switching process will repeat.

Figure 3A:
FIGS. 3A to 3F show graphs of voltage and current during operation of the circuit of FIG. 2.
Figure 3B:
Figure 3C:

With respect to drawing FIGS. 3A to 3F, the graphs of voltage and current during operation of the circuit of FIG. 2 are shown. FIGS. 3A and 3B show typical asymmetric gate driving pulses for the MOSFET switches 40 and 42. The duty cycle of the control pulses are programmed to maintain a regulated DC output voltage at the converter output terminal across the resistor 68 shown in FIG. 2. A small idling time period is inserted between the turn off and turn on of the switches 40 and 42, as shown in the timing of the gate pulses to drive the switches in FIGS. 3A, 3B and 3C. The switch 34 (FIG. 3A) in the boost converter is turned on shortly after the switch 40 (FIG. 3B) in the DC/DC converter has turned on but may turn off at any time in the cycle as explained above.

Figure 3D:
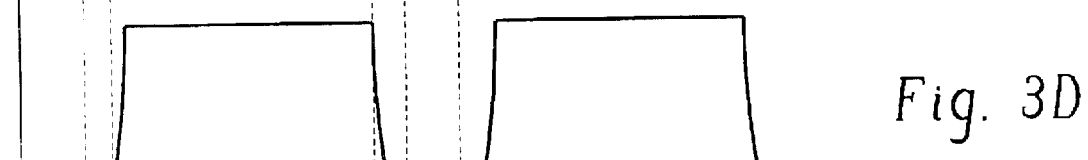
Figure 3E:
Figure 3F:
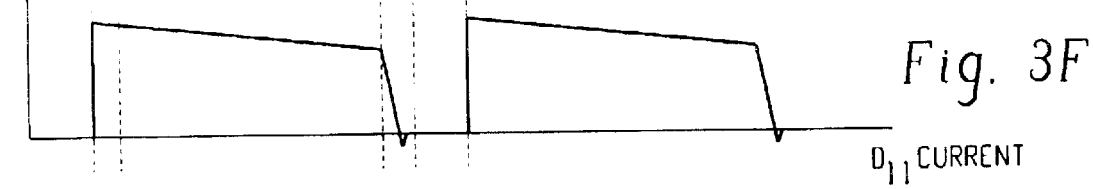

In FIGS. 3D and 3E, when the switch 42 turns off, current in the inductor 28 pulls the voltage at the drain terminals of the switches 40 and 34 at nodes 17 and 13 respectively, although these voltages may not fall at the same time and rate. Also, FIG. 3D shows that when the switch 40 turns off, the current flowing in the inductor 28 will push the voltage at node 17 high and reduce the voltage across the switch 42. The gate driving pulse will turn on the switch 42 when its drain source voltage has dropped to substantially zero. In FIG. 3F, current through the diode 36 decreases in this transient period until it reaches zero. The switch 34 is programmed to turn on after its voltage is substantially zero. The same switching applies to the switch 40 which is programmed to turn on after its voltage is substantially zero. Thus, both switches 34 and 40 have zero voltage turn on. The diode 36 can then switch off with less reverse current. FIG. 3F shows the current slope of the diode 36 has been limited, the reverse current can be controlled to be small which limits any significant losses. Thus, all switches 34, 40 and 42 may turn on at zero voltage state.

Figure 4:
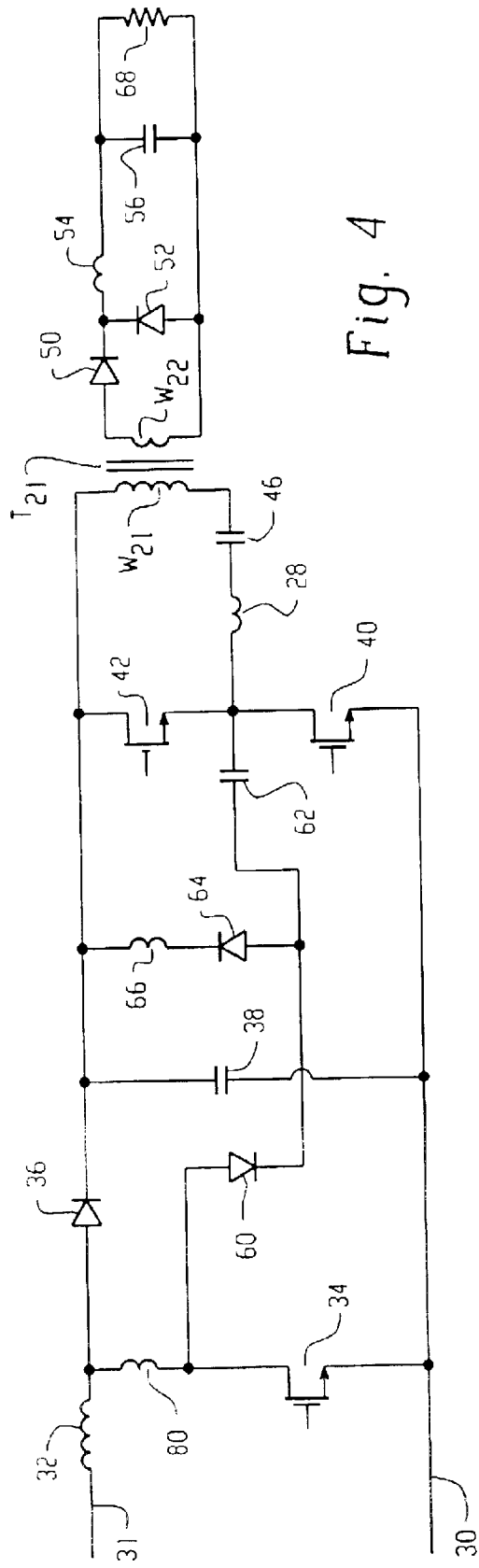
FIG. 4 shows a circuit comprising a second embodiment of the present invention.

With respect to FIG. 4, a second embodiment of the present invention is shown. This second embodiment differs from the first embodiment in the placement of a small inductor 80 for resonance to provide zero voltage switching of the switch 34 in the boost converter. In the first embodiment, the small inductor 58 is placed in the coupling chain of components connecting the boost converter and the DC/DC converter. Nevertheless, this is not the only location to place the inductor. In this second embodiment, the inductor 80 is placed in series with the switch 34 in the boost converter. The switches 34, 40 and 42 are controlled similar to the switches in FIG. 2, and the output of the circuit is similar.

When the switch 34 switches off and the capacitor 62 has discharged to near zero, the energy stored in the inductor 80 is released through the diode 60 and flows through the coupling and discharging branches. The current through the inductor 80 settles to zero and the inductor current through the inductor 32 will flow through the boost diode 36 similar to other boost converters.

Figure 5:
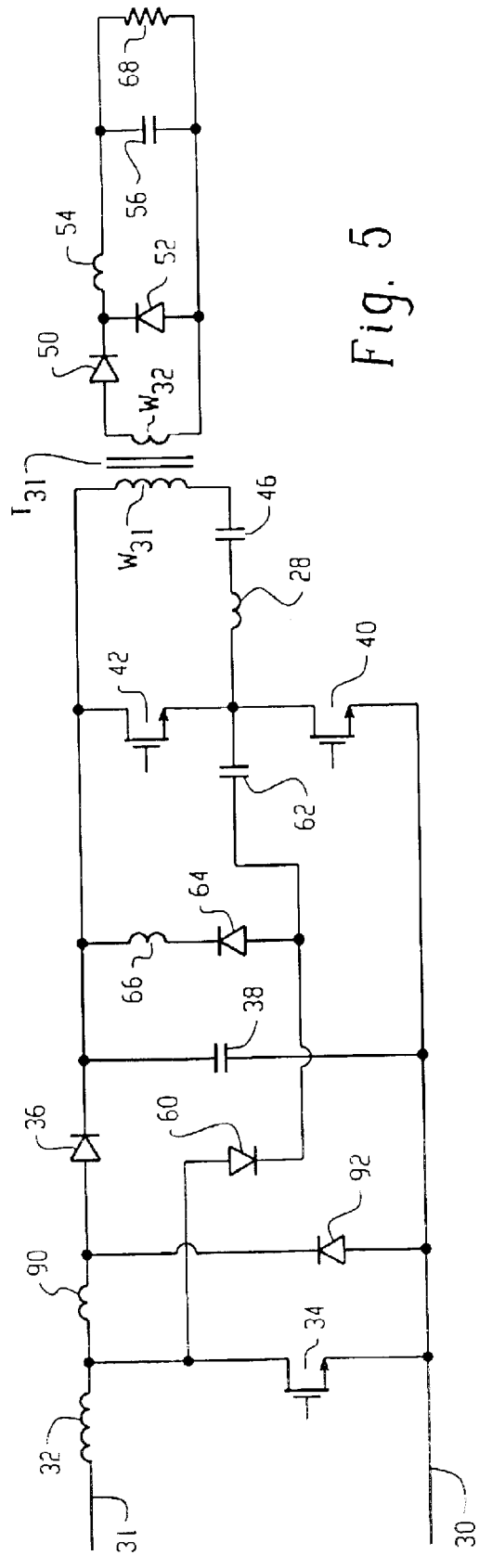
FIG. 5 shows a circuit comprising a third embodiment of the present invention.

A third embodiment of the present invention is shown in FIG. 5. This third embodiment differs from the first two embodiments in the placement of a small inductor 90 and a diode 92 for resonance to provide zero voltage switching of the switch in the boost converter. This third embodiment has the inductor 90 placed in between the input inductor 32 and the diode 36 of the boost converter. Another leg, which includes the diode 92, is placed in the circuit between the inductor 90 and the diode 36, and is then extended to the input terminal 30. The switches 34 and 40 act substantially the same in this embodiment as they act in the first embodiment. When the voltage across the switch 40 falls, the voltage across the switch 34 falls simultaneously due to the coupling of the switches by the capacitor 62.

The aforementioned embodiments use two small inductors, one coupled to the boost diode 36 and another one placed near the DC/DC converter primary side switches 40 and 42, to obtain less voltage stress during turn off of the diode 36 and turn on of the switches 40 and 42. Nevertheless, it is possible to combine these two small inductors into one inductor to further reduce the converter component count.

Figure 6:
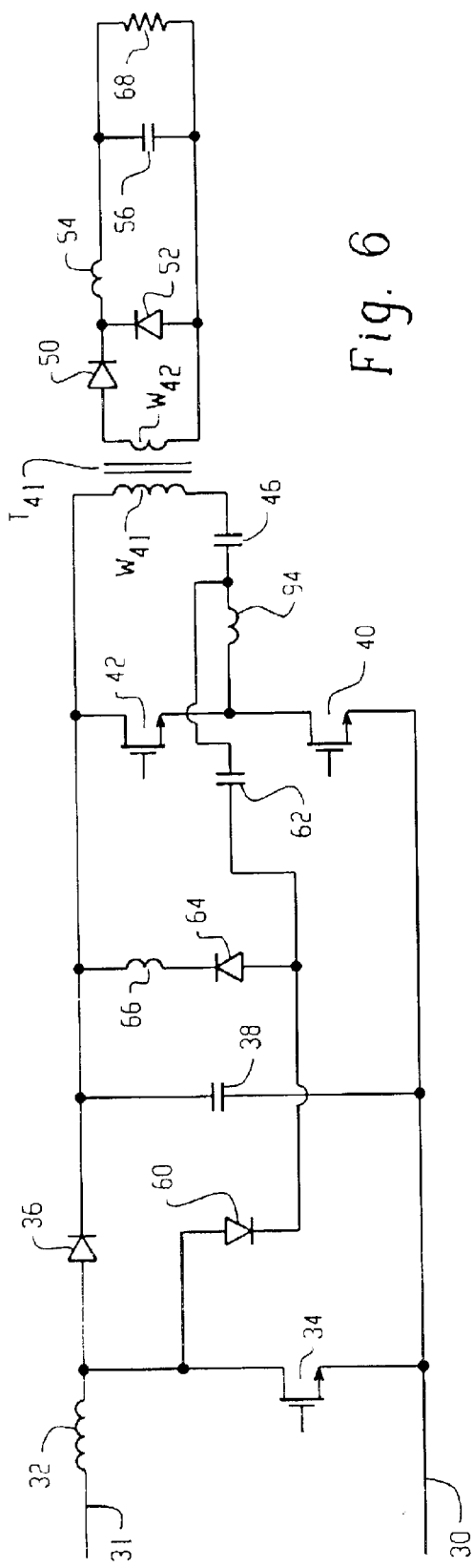
FIG. 6 shows a circuit comprising a fourth embodiment of the present invention.

Turning now to FIG. 6, a circuit comprising a fourth embodiment of the present invention is shown. The embodiment is similar to the first embodiment, except the inductor 58 (FIG. 2) in the coupler chain and the soft switching inductor 28 (FIG. 2) are combined into a single inductor 94 coupled to the switches 40 and 42. The inductor 94 provides soft turn off of diode 36 and also reduces voltage stress turn on of the switches 34, 40, and 42.

When the switch 40 turns off, the current flowing in the series inductor 94 will continue to flow and discharge the stray capacitance across the drain source of the switch 40. The voltage across the switch 42 will drop accordingly. The switch 40 then turns on when the voltage across the switch 40 drops to zero. The current flow direction of the inductor 90 then reverses and shunts the current flowing through the boost diode 36. The inductor 94 also discharges the stray capacitance of the switch 34 via the path comprising the diode 60 and the energy limiting capacitor 62. The voltage across the switch 34 then falls. When the voltage drops to essentially zero, then the switch 34 can be turned on with no switching loss. The rate of fall of current and the reverse recovery current during the turn off of the diode 36 is limited by the inductor 94, therefore the turn off losses of the boost diode 36 can also be reduced.

Figure 7:
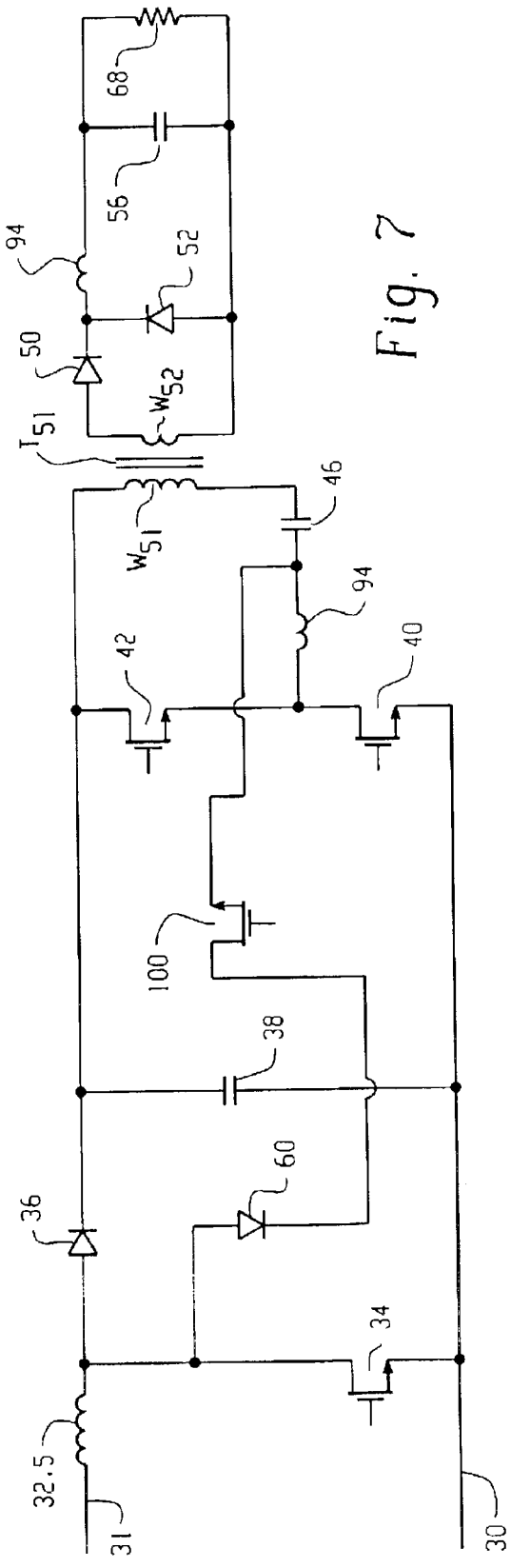
FIG. 7 shows a circuit comprising a fifth embodiment of the present invention.

Turning now to FIG. 7, a circuit comprising a fifth embodiment of the present invention is shown. This embodiment functions similar to the first embodiment, but the component count of this circuit is less. The capacitor 62 in the coupler chain and the discharge chain of the first embodiment are replaced by an active switch 100, which couples the boost converter to the DC/DC converter. The coupler chain, including the diode 60, the switch 100 and the inductor 94, can softly turn off the boost diode 36 and reduce the turn on voltage of the switch 34 by selecting proper gate driving timing of the four switches 34, 40, 42, and 100. The inductor 94 provides soft turn off of the diode 36 and reduces voltage stress turn on for the switches 34, 40, and 42.

In the previous embodiments, an energy limiting capacitor 62 limits energy transfer from the PFC boost converter side to the DC/DC converter side. Another diode 64 and an inductor 66 release the stored energy of the capacitor 62 through the discharge chain. In the fifth embodiment, these components are replaced by the small active switch 100 which limits the energy transfer between the boost converter and the DC/DC converter during the switching transient by timing the gate signals of the switch 100 based upon the timing signals for the other gates 34, 40, and 42.

With respect to FIGS. 8A to 8D, graphs of the driving waveforms for the switches of the circuit of FIG. 7 are shown. FIGS. 8A to 8C are similar to FIGS. 3A to 3C, which are the gate drives for the switches 40, 42, and 34, respectively. As shown in FIG. 8D, the additional switch 100 is programmed to turn on before the switch 42 turns off. The switch 100 remains on throughout the transient during which the switches 34 and 40 switch on softly and the switch 42 turns off softly. Afterwards, this auxiliary switch 100 will then turn off and stop energy flow between the boost converter and the DC/DC converter side. This auxiliary switch 100 does not need to handle main power transfer, and it can be a very small MOSFET which operates for a short period of time.

The embodiments described herein are examples of structures having elements corresponding to the elements of the invention recited in the claims. This written description may enable those skilled in the art to make and use embodiments having alternative elements that likewise correspond to the elements of the invention recited in the claims. The intended scope of the invention thus includes other structures that do not differ from the literal language of the claims, and further includes other structures with insubstantial differences from the literal language of the claims.

What is claimed is:

1. A power converter, comprising:
   a boost converter that receives a rectified AC input and generates a high voltage output, the boost converter including a zero-voltage-switching transistor that is operable to adjust the power factor of the rectified AC input to generate the high voltage output;
   a DC/DC converter coupled to the high voltage output of the boost converter and configured to generate a regulated output voltage, the DC/DC converter including a complementary pair of zero-voltage-switching transistors that are operable to regulate the high voltage output of the boost converter to generate the regulated output voltage; and
   a coupler chain coupled between a current-carrying terminal of the zero-voltage-switching transistor of the boost converter and current-carrying terminals of the complementary pair of zero-voltage-switching transistors in the DC/DC converter, the coupler chain being operable to reduce the voltage across the current-carrying terminals of at least one of the zero-voltage-switching-transistors.

2. The power converter of claim 1, further comprising:
   a discharge chain coupled between the coupler chain and the high voltage output of the boost converter, the discharge chain being operable to discharge one or more reactive circuit components of the coupler chain.

3. The power converter of claim 1, wherein the boost converter includes a diode coupled in series between one input terminal of the boost converter and one output terminal of the boost converter and coupled to one current-carrying terminal of the zero-voltage-switching transistor in the boost converter, wherein the coupler chain is operable to reduce the flow of current through the diode at a controlled rate.

4. The power converter of claim 3, wherein the boost converter further includes an inductor coupled in series with the diode.

5. The power converter of claim 4, wherein the boost converter further includes a capacitor coupled in parallel between a positive output terminal and a negative output terminal of the boost converter.

6. The power converter of claim 1, wherein the coupler chain is coupled between the current-carrying terminal of the zero-voltage-switching transistor of the boost converter and a node connecting a current-carrying terminal of one of the complementary pair of zero-voltage-switching transistors with a current-carrying terminal of another of the complementary pair of zero-voltage-switching transistors.

7. The power converter of claim 6, wherein the coupled chain is coupled between a drain terminal of the zero-voltage-switching transistor of the boost converter and a node connecting a source terminal of one of the complementary pair of zero-voltage-switching transistors with a drain terminal of another of the complementary pair of zero-voltage-switching transistors.

8. The power converter of claim 1, wherein the DC/DC converter includes a transformer, and wherein the complementary pair of zero-voltage-switching transistors are operable to generate a series of voltage pulses feeding into a primary winding of the transformer, a secondary winding of the transformer generating the regulated output voltage of the DC/DC converter.

9. The power converter of claim 8, wherein the DC/DC converter includes a soft switch inductor coupled in series between the primary winding of the transformer and a node that connects a current-carrying terminal of one of the complementary pair of zero-voltage-switching transistors with a current-carrying terminal of another of the complementary pair of zero-voltage-switching transistors.

10. The power converter of claim 9, wherein the soft switch inductor is coupled in series between the primary winding of the transformer and the coupler chain.

11. The power converter of claim 8, wherein the DC/DC converter includes a rectifier and filter circuit coupled to the secondary winding of the transformer and operable to filter the regulated output voltage.

12. The power converter of claim 1, wherein the coupler chain includes an inductor, a diode and a capacitor coupled in series.

13. The power converter of claim 1, wherein the coupler chain includes a diode and a capacitor coupled in series.

14. The power converter of claim 1, wherein the coupler chain includes a diode coupled in series with the current-carrying terminals of a transistor.

15. The power converter of claim 2, wherein the discharge chain includes a diode couple in series with an inductor.

* * * * *